INVENTOR
STANLEY S. BRODY

INVENTOR
STANLEY S. BRODY

INVENTOR
STANLEY S. BRODY

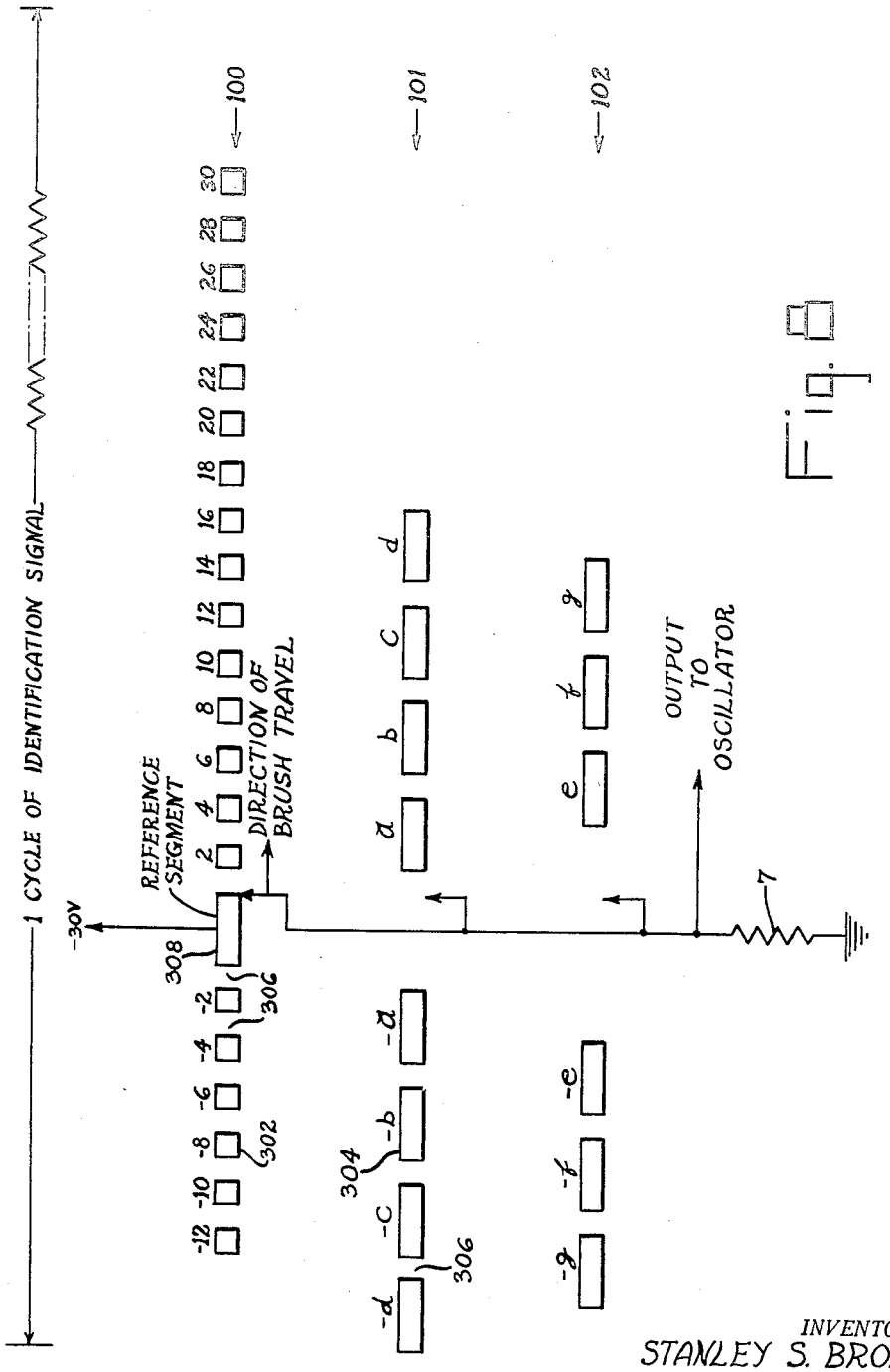

2,866,185
UNIVERSAL NAVIGATION STATION IDENTIFICATION KEYER

Stanley S. Brody, Brooklyn, N. Y.

Application February 25, 1953, Serial No. 338,926

1 Claim. (Cl. 340—365)

(Granted under Title 35, U. S. Code (1952), sec. 266)

The invention described herein may be manufactured and used by or for the Government of the United States of America for governmental purposes without the payment of any royalties thereon or therefor.

This invention relates in general to station identification systems and more particularly to the reproduction of radio range navigation identification and position signals for use with aviation ground training equipment.

Various navigation and station identification systems and devices have been proposed and have been utilized. However, these systems suffer from numerous disadvantages and serious defects.

At present, aviation ground trainers employ synthetic methods of reproducing transmitted radio range information that employ, mainly, push button or knob rotation. The keyer system employs push buttons that represent dots and dashes, and the output represents radio navigation station information in the form of the Morse code. Although such system is accurate with respect to time, the system is difficult and time consuming to set accurately.

In a simulated cross country flight, the instructor may have to alter the navigation station identification signal every ten minutes. The various letters must be converted to the Morse code and then set into the device. This method is susceptible to errors and consumes valuable instructor time that should be devoted to the student. To obtain a realistic signal, the instructor must be familiar with the More code and the time spacing of the various dots and dashes of each letter. In the keyer system wherein the rotation of a knob is utilized to obtain a desired letter of identification, the output identification signal is inaccurate and unrealistic with respect to the time spacing of the dots and dashes.

The present invention has the desirable characteristics of the mentioned devices, without the latent defects or hindrances. These characteristics are mainly simplicity, speed of setting in new letters of identification, and the realistic simulation of actual signal output. This device converts a three letter code word that is fed into the device by first, second and third manually operated knobs into their Morse code equivalent wherein the time duration between the characters of each letter, and the time duration separating the letters from each other, are maintained accurately regardless of the letters in the code word. The knobs have twenty-six steps or positions, each step representing a different letter of the alphabet arranged in the customary order to indicate the desired information. The third knob has a twenty seventh or "off" position for the generation of two letter code words. The instructor sets the knobs to indicate the desired letters, and this input information is transformed into a potential that feeds an oscillator through brush coupled conductive segments. The oscillator is on continuously until cut off by the presence of the actuating voltage. In this device, the last character of the Morse code equivalent of the first letter will always terminate at a specific conductive segment, and the first character of the Morse code equivalent of the second letter will always commence at the termination of the same specific conductive segment. Said specific conductive segment is three-tenths of a second in length, so that the time spacing between said first and said second letter will always be three-tenths of a second.

The voltage representing the third letter, as determined by the position of the third switch, is supplied to the conductive segments through a stepping relay that is oriented by the second switch. Thus, the stepping relay automatically orients the conductive segments relative to the third switch to commence the first character of the Morse code equivalent of the third letter three-tenths of a second after the termination of the second letter. This device thus generates the Morse code equivalent of any three letter code word, and the input consists of a single knob for each letter while the output is accurate with respect to the time spacing between each letter regardless of the combination of the letter in the code word.

In accordance with the invention a variable position control switch is also provided which, in one position, simulates the Very High Frequency Omni Range stations and in another position simulates the Distant Measuring Equipment stations. The Distant Measuring Equipment stations are distinguished by the long tone signal after the station identification.

The present invention is useful in simulating or reproducing accurately the various radio signals or information that is transmitted from the various navigation stations a few of which, when represented by name, are as follows: Very High Frequency Omni Range, Instrument Landing System, Homing, Compass locaters and Distant Measuring Equipment stations.

Although the device is intended primarily for use as a simulator, it could be employed in connection with a conventional oscillator to set up actual transmitted signals of a radio range station.

Accordingly it is an object of this invention to provide a navigation station identification system that can be set to simulate the code letters of the various navigation stations that are used for aerial navigation.

It is another object to provide a system that will convert identification letters of navigation stations to the various dots and dashes of the Morse code automatically.

It is another object to provide a navigation station identification system that will transmit the various identification letters accurately and without any time delay or lag between the letters.

It is another object to alter rapidly and accurately the identification letters of one navigation station to the identification letters of another navigation station.

It is another object to reproduce accurately the identification letters of aerial navigation stations.

Other objects and many of the attendant advantages of this invention will be readily appreciated as the same becomes better understood by reference to the following detailed description when considered in connection with the accompanying drawings wherein.

Figure 5:
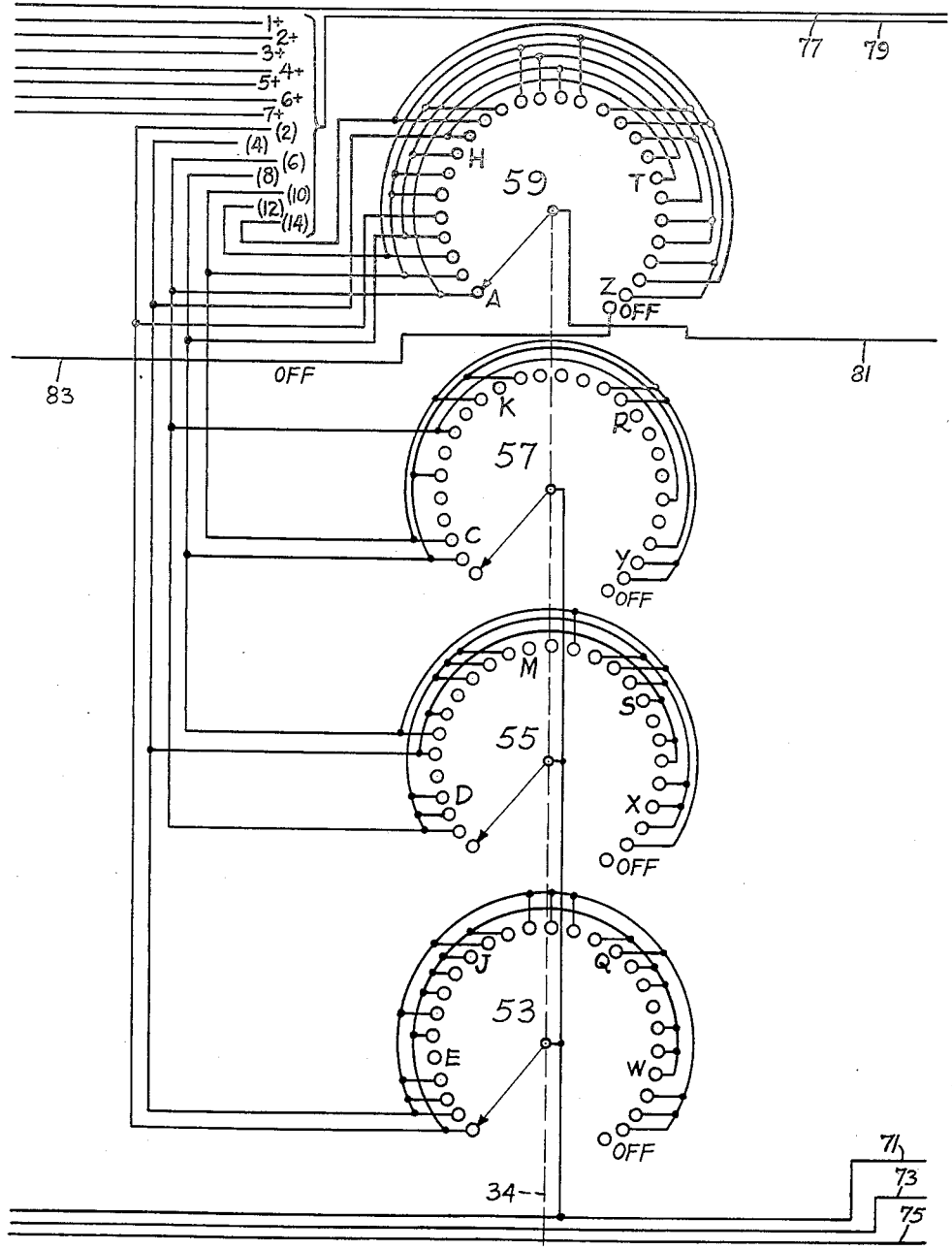

Figure 5 indicates the wiring connections of the four rotary switches that constitute the third bank of switches that is used for the determination of the third letter of the station identification series.

Figure 6 illustrates the various connections of the stepping relay, two other relays and three rotary switches of the motor driven bank.

Figure 7 indicates the proper order of all of the sheets of drawings with respect to each other.

Fig. 8 is a diagrammatic representation of the rotary switch segments.

Figure 1:
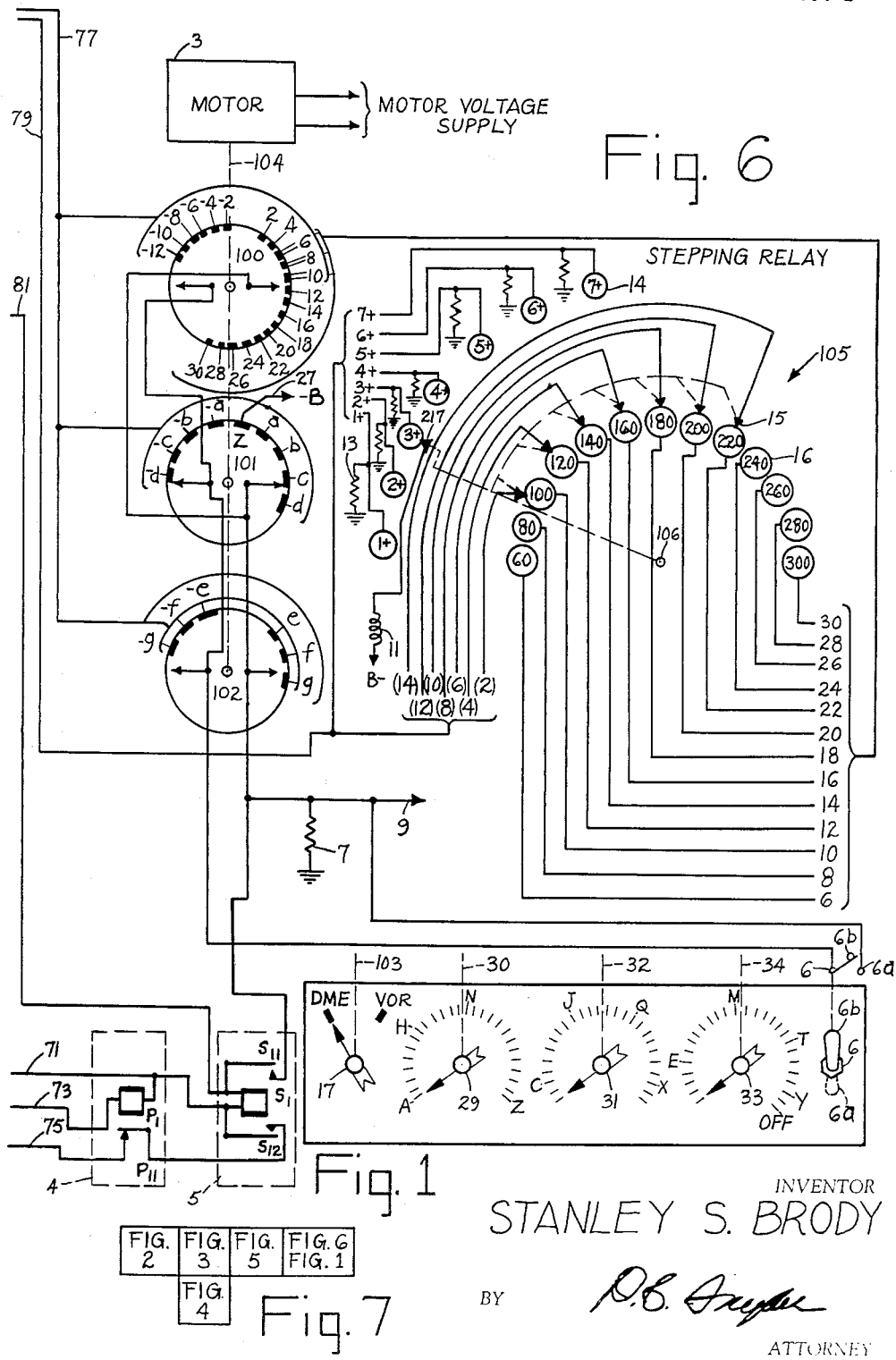
Figure 1 shows the face of the control panel with the location of the various control indicators.

Referring now to Figure 1 and a description of the invention there is shown three adjustable control indicators 29, 31 and 33. The indicators are located on an easily accessible panel. The positioning of the control indicators 29, 31 and 33 determines the two or three letter Morse code station identification call letters of the station being simulated. A station identification signal containing two letters is formed by setting indicator 33 to the off position. The panel areas around indicators 29, 31 and 33 are calibrated in the letters of the alphabet arranged in the usual manner. Therefore each indicator has a minimum of twenty-six positions, each position for a distinct letter of the alphabet. Indicator 33 has an additional or twenty seventh setting for the off position.

Switch 6 is of the double throw type and can be placed in either one of two positions 6a or 6b. When switch 6 is in position 6b the time required to complete one cycle is six seconds. By placing switch 6 in position 6a, the time required to complete one cycle is decreased to three seconds. This decrease of the time duration is necessary for realistic transmission when the station identification signal has a very short time duration.

Switch 17, located conveniently on the control panel, is of the two position type. One position is for the VOR station identification signals and the other position is for the reproduction of DME station identification signals. The DME station identification signal is distinguished from the VOR station identification signal by the presence of the long single tone signal at the end of each identification signal.

Switches 29, 31 and 33 are utilized in the selection of the identification signals. Switch 29 is used for the selection of the first letter of the desired series.

Figure 2:
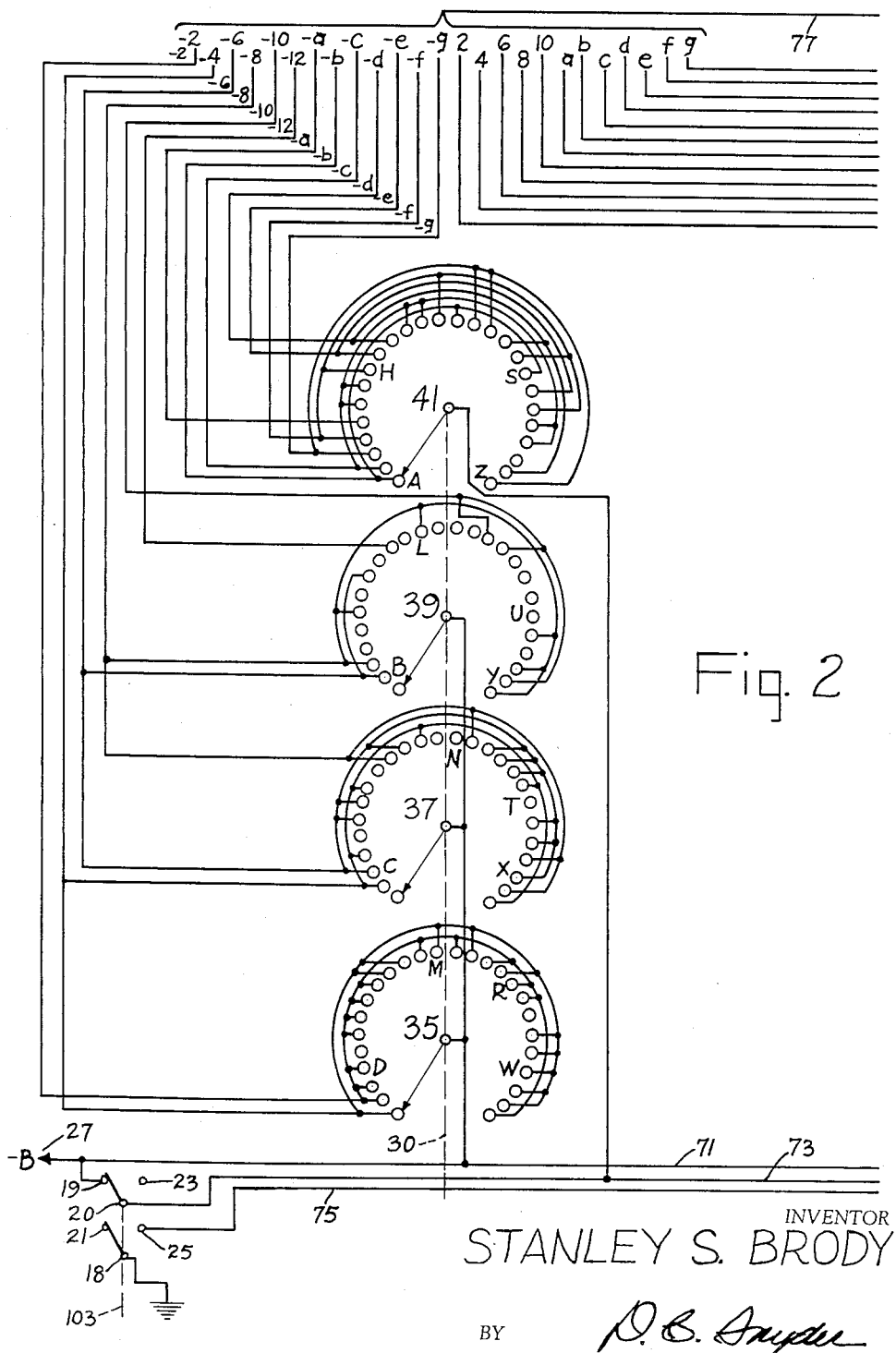
Figure 2 depicts the location and wiring diagram of the bank of switches that is utilized in the selection of the first letter.

The rotor arms of decks 35, 37, 39 and 41 as illustrated in Figure 2, are mechanically connected to the manually operated indicator 29 through rotatable rod or shaft 30.

Figure 3:
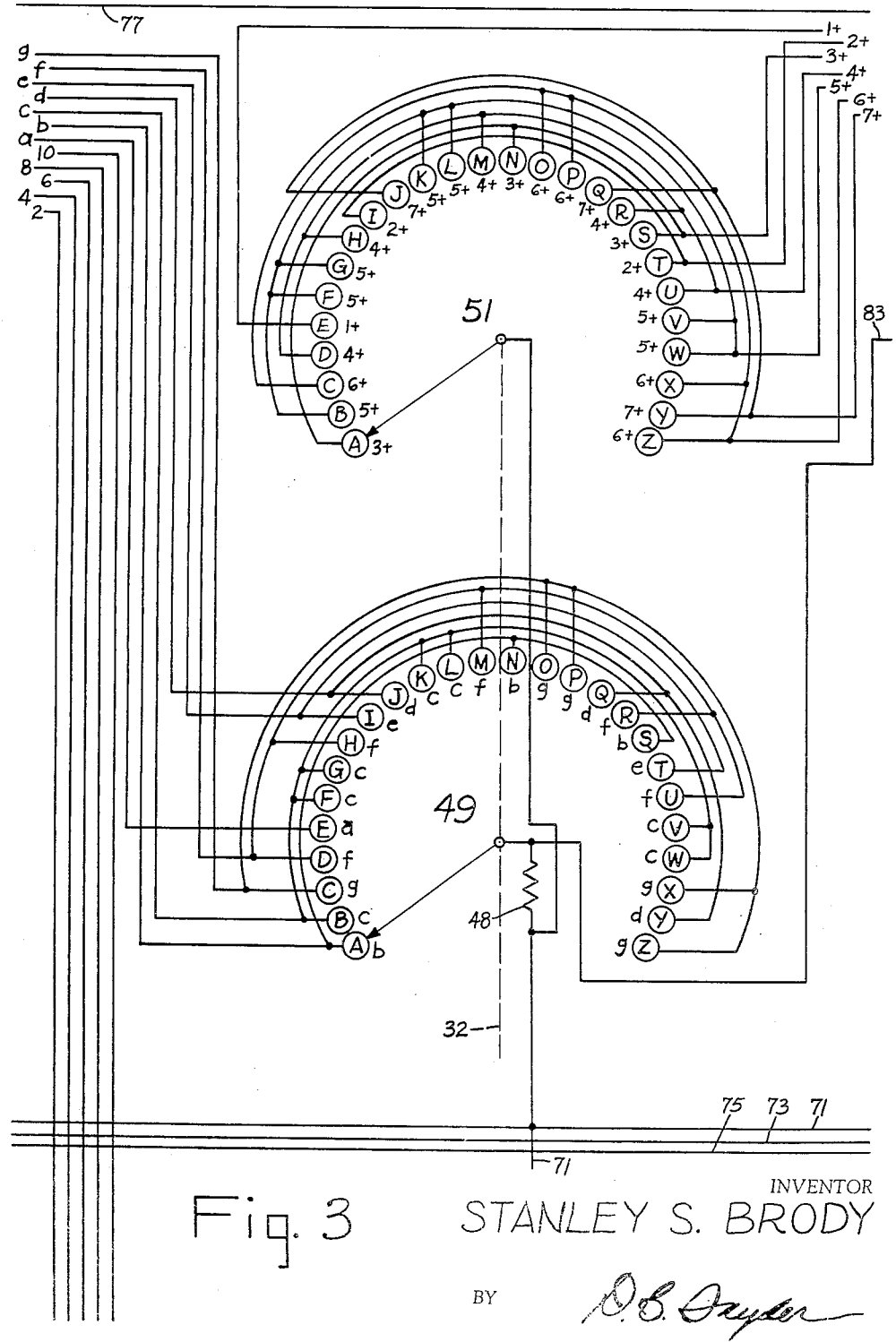
Figure 3 illustrates the various wiring connections of the last two rotary switches of that bank of switches that is utilized in the selection of the second letter of the station identification series.
Figure 4:
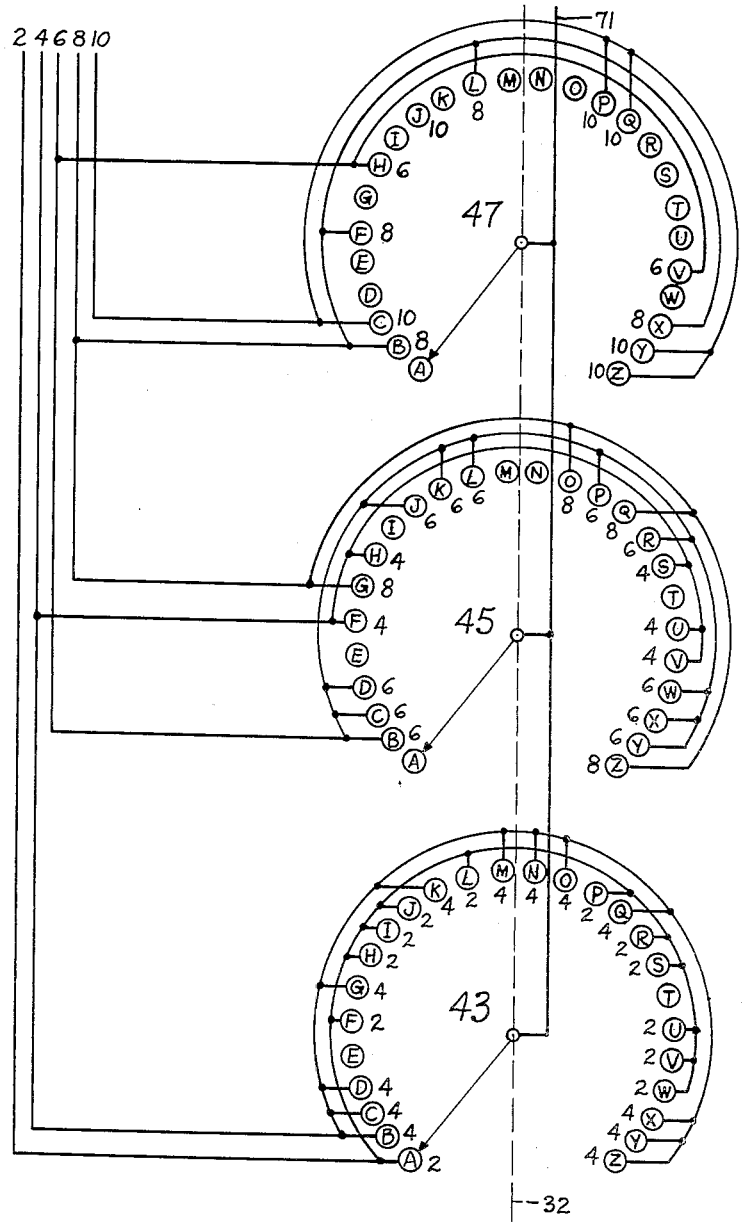
Figure 4 illustrates the wiring connections of the first three rotary switches of that bank of switches that is uilized in the selection of the second letter of the station identification series.

The rotor arm of decks 43, 45 and 47 of Figure 4 and rotor arm of decks 49 and 51 of Figure 3 are mechanically interconnected to the indicator 31 through rotatable shaft 32.

The rotor arms of decks 53, 55, 57 and 59 of Figure 5 are mechanically connected to the indicator 33 through rotatable shaft 34.

Referring to Figures 1 and 2, electrical contacts 18, 21, 25, 20, 19 and 23 are activated by means of rotatable shaft 103 connected to indicator 17.

Referring to Figure 6, the rotatable brushes of switches 100, 101 and 102 are rigidly connected to shaft 104 so that there is no relative motion between the rotatable brushes of the above mentioned switches. Motor 3 is connected to rotatable shaft 104 and is the prime mover of the brushes.

In the same figure, relay 4 is a normally closed relay containing one set of normally closed contacts. Relay 5 is a time delay relay containing two sets of normally open contacts. Relay 5 has a time delay of .2 second on dropping out. Therefore relay 5 will remain closed for .2 second after the voltage has been removed from the relay coil.

The length of the conducting and non-conducting segments are such that when it is mentioned that a segment is 0.1 second in length it is understood that the rotating brush will contact the conducting segment for a time interval of 0.1 second. The factors that determine the length of the conducting and the non-conducting segments are brush-speed and diameter of wheel.

The electrical conducting segments of rotary switch 100 are 0.1 second in length and are separated by non-conducting segments that are 0.1 second in length. The electrical contact segments of rotary switches 101 and 102 are 0.3 second in length and are separated by non-conducting segments that are 0.1 second in length. The angular relationship of the conducting segments and the rotary contacts of switches 100, 101 and 102 as shown in Figure 6, should be maintained as shown in the drawing as the three switches cooperate with each other and operate simultaneously to produce the desired dots and dashes that identify a particular navigation station.

A better conception of the spatial relationships between the conductive segments of the rotary switches 100, 101 and 102 (which may also, of course, be a single commutator-like device with three rows of conductive segments) may be obtained from Fig. 8. Fig. 8 is simply a diagram of the segments of the rotary switches 100, 101 and 102 as they would appear if they were straightened out and the scale of Fig. 6 were expanded. Only a single set of brushes is illustrated.

The arrangement and lengths of the segments 302 and spaces 306 of rotary switch 100 operate to break the period of the identification signal into unit time elements corresponding in this instance to 0.1 second (except for the reference interval which is 0.3 second). The occurrence of the reference interval (which is produced when the brush traverses the reference segment 308) varies in time relative to the start of different identification signals, even though the position of the reference segment 308 is fixed relative to the other conductive segments. This is because the characters (dots and dashes) of the first letter are set up backwards (relative to the direction of brush travel) starting from the front edge of the reference segment 308. Thus, the last character of the first letter (i. e., the dash in the letter "A") is made to immediately precede the reference interval without any intervening interval.

An introduction interval of 0.3 second is always set up immediately preceding the first character of the first letter. The number of conductive segments 302, 304 and spaces 306 preceding the reference segment 308 is sufficient to accommodate the identification-signal introduction interval plus the characters and inter-character intervals which form the Morse-code symbol of longest duration.

The first character of the second letter of the identification symbol is set up to start immediately after the end of the reference interval. Thus, the end of the first letter and the beginning of the second are fixed with respect to the position of the reference interval and the only problem is that of causing the beginning of the third letter to occur immediately after the second inter-character interval (0.3 second) which shafts position according to the length of the Morse-code symbol for the selected second letter. This problem is solved by the use of a stepping relay 105, as will be explained hereinafter.

An identification-signal completion interval of 0.3 second is caused to occur immediately after the end of the last character of the last letter. There may, or may not be a tone between the end of the completion interval and the beginning of the introduction interval, and the last letter of the identification signal may be dispensed with.

It will be apparent upon analysis that the lengths of the segments and spaces and their geometrical positioning with respect to the reference segment permits the setting up of the proper conditions for the production of a coded identification symbol representing any three letters of the alphabet, in which identification signal the first and third letters are always separated from the second letter by an identical interval regardless of the time duration of the code symbols which may be selected.

It should be noted that the only space or character which is fixed in time relative to the period of the identification-signal cycle is the reference interval.

The stepping relay 105 shown in Figure 6 consists of a coil 11, a movable contact 217 rotatable about a shaft 106, and a plurality of movable and stationary contacts. Movable contact 217 is connected in series with coil 11 and determines the final angular position of the plurality of movable contacts for each group of station identification signals.

Rotatable contacts 15 of stepping relay 105 are rigidly connected to the same rotor 106 that contact 217 is mechanically connected to. Therefore rotatable contacts 15 will advance one position along stationary contacts 16 each instant that rotatable contact 217 advances one position along stationary contacts 14. The movable contacts of the stepping relay continue to rotate until contact 217 makes contact with a segment that has a voltage potential. At this instant the stepping relay ceases to operate. The angular position of the movable contacts of the stepping relay is contacted by switch 51 of Figure 3.

Referring to Figure 2 in the deck 35, the following connection are left open, E and T. Contacts A, J, K, M, O, Q, U, V, W, X and Y are interconnected with each other and terminate at segment —4 of deck 100 in Figure 6. All the remaining contacts of switch 35 are interconnected and terminate at segment —2 of deck 100.

Referring to deck 37, contacts A, E, I, M, N and T are blank. Contacts B, D, H, L, S and Z are interconnected with each other and terminate at segment —4 of deck 100. Contacts C, F, G, K, P, Q, R, U, V and X are coupled together and terminate at segment —6 of deck 100. Contacts J, O, W and Y are coupled together and terminate at segment —8 of deck 100.

Referring to deck 39, contacts A, D, E, G, I, K, M, N, O, R, S, T, U and W are open. Contacts B and H are coupled together and terminate at segment —6 of deck 100. Contacts C, F, L, V, X and Z are coupled together and terminate at segment —8 of deck 100. Contact J is connected to segment —12 of deck 100. Contacts P, Q, and Y are coupled together and terminate at segment —10 of deck 100.

Referring to deck 41, contacts A, N and S are coupled together and terminate at segment —b on deck 101. Contacts B, F, G, K, L, Y and W are coupled together and terminate at segment —C of deck 101. Contact E is connected to segment —a of deck 101. Contacts J, Q and Y are coupled together and terminate at segment —d of deck 101. Contacts I and T are connected to segment —e of deck 102. Contacts D, H, M, R, and U are coupled together and terminate at segment —F of deck 102. Contacts C, O, P and Z are coupled together and terminate at segment —g of deck 102.

Referring to deck 43 of Figure 4, contacts E and T are open circuits. Contacts A, F, H, I, J, L, P, R, S, U, V and W are coupled together and terminate at segment 2 of deck 100. Contacts B, C, D, G, K, M, N, O, Q, X, Y and Z are coupled together and terminate at segment 4 of deck 100.

Referring to deck 45, of Figure 4, contacts A, E, I, M, N, and T are open. Contacts B, C, D, J, K, L, P, R, W, X and Y are coupled together and terminate at segment 6 of deck 100. Contacts F, H, S, U, and V are coupled together and terminate at segment 4 of deck 100. Contacts G, O, Q, and Z are interconnected and terminate at segment 8 of deck 100.

Referring to deck 47, of Figure 4, contacts A, D, E, G, I, J, K, M, N, O, R, S, T, U and W are open circuits. Contacts B, F, L and X are coupled together and terminate at segment 8 of deck 100. Contacts C, P, Q, Y and Z are coupled together and terminate at segment 10 of deck 100. Contacts H and V are connected to segment 6 of deck 100.

Referring to deck 49, of Figure 3, contacts C, O, P, X and Z are coupled together and terminate at segment g of deck 102. Contacts D, H, M, R and U are coupled together and terminate at segment F of deck 102. Contact E is connected to segment A of deck 101. Contacts I and T are connected to segment e of deck 102. Contacts J, Q, and Y are coupled together and terminate at segment d of deck 101. Contacts A, N and S are coupled together and terminate at segment b of deck 101. Contacts B, F, G, K, L, V and W are coupled together and terminate at segment C of deck 101. Deck 51, of Figure 3, is utilized as the control of a slave stepping relay 105. Deck 51 is constructed so that its rotor makes an electrical connection with one contact at any instant. The rotor 106 of the slave stepping relay 105 (Figure 6) continues to rotate until contact 217 makes connection with a stationary contact that has a potential of B minus. When this condition is reached, the rotor 106 of the stepping relay 105 ceases to rotate and remains in that position until the rotor of deck 51, of Figure 3 is turned to a new position.

Referring to deck 51 of Fig. 3 and the stepping relay of Fig. 6; contact E of deck 51 is connected to terminal 1+ of the stepping relay 105. Contacts A, N and S of deck 51 are coupled together and are connected to terminal 3+ of relay 105. Contacts I and T are connected to terminal 2+ of relay 105. Contacts D, H, M, R and U are coupled together and are connected to terminal 4 of relay 105. Contacts B, F, G, K, L, V and W of deck 51 are coupled together and terminate at terminal 5+ of relay 105. Contacts J, Q and Y are coupled together and terminate at terminal 7+ of relay 105. Contacts C, O, P, X and Z are coupled together and terminate at terminal 6+ of relay 105.

Referring to deck 53 of Fig. 5 and relay 105 of Fig. 6, contacts E, T and "Off" are open. Contacts A, F, H, I, J, L, P, R, S, U, V and W are coupled together and terminate at rotor connection (2) of relay 105. Contacts B, C, D, G, K, M, N, O, Q, X, Y and Z are coupled together and terminate at rotor connection (4) of relay 105.

Referring now to deck 55 and stepping relay 105, contacts A, E, I, M, N, T and "Off" are open. Contacts B, C, D, J, K, L, P, R, W, X and Y are coupled together and terminate at rotor connection (6) of relay 105. Contacts F, H, S, U and V are coupled together and terminate at rotor connection (4) of relay 105. Contacts G, O, Q and Z are coupled together and terminate at rotor connections (8) of relay 105.

Referring to deck 57, contacts A, D, E, G, I, K, M, N, O, R, S, T, U, W and "Off" are open circuits. Contacts B, F, L and X are coupled together and terminate at rotor connection (8) of relay 105. Contacts C, J, P, Q, Y and Z are coupled together and terminate at rotor connection (10) of relay 105. Contacts H and V are connected to rotor connection (6) of relay 105.

Referring to deck 59, the "Off" contact is electrically connected to the B— through conductor 83 and a resistor 48 in deck 49 of Figure 3. Contacts A, N and S are connected to rotor connection (6) of relay 105. Contacts B, F, G, K, L, V and W are coupled to rotor connection (10) of relay 105. Contacts C, O, P, X and Z are connected to rotor terminal (12) of relay 105. Contacts D, H, M, R and U are connected to rotor terminal (8) of relay 105. Contact E is connected to rotor terminal (2) of relay 105. Contacts I and T are connected to rotor terminal (4) of relay 105. Contacts J, Q and Y are connected to rotor terminal (14) of relay 105.

Referring to stepping relay 105 of Fig. 6, stator contacts 60, 80, 100, 120, 140, 160, 180, 200, 220, 240, 260, 280 and 300 are connected to segments 6, 8, 10, 12, 14, 16, 18, 20, 22, 24, 26, 28 and 30 respectively of deck 100.

Referring to decks 35, 37, 39 and 41 of Fig. 2; the rotor arms of decks 35, 37 and 39 are coupled electrically, in parallel, to the negative voltage on conductor 71. The rotor arm of deck 41 is coupled electrically to conductor 73.

Referring to decks 43, 45, 47, 49 and 51 of Figs. 4 and 3; the rotor arms of decks 43, 45, 47 and 51 are coupled electrically in parallel, directly to the negative voltage supply through conductor 71. The rotor arm of deck 49 is coupled electrically to the negative supply voltage, carried by conductor 71, through a resistor 48. This rotor arm is coupled directly to the off contact of deck 59 of Fig. 5 through electrical conductor 83.

Referring to decks 53, 55, 57 and 59 of Figure 5; the rotor arms of decks 53, 55, and 57 are coupled electrically in parallel to the negative voltage bearing conductor 71. The rotor arm of deck 59 is coupled electrically to one side of the coil of delay relay 5 through conductor 81.

Referring now to decks 100, 101 and 102 of Figure 6 and switch 6 of Fig. 1, each deck has two rotating contacts of brushes that are separated by an angle of 180 degrees. In deck 100, one rotating contact is connected to ground through resistor 7. The second rotating contact is an open circuit when switch 6 is in position 6b, and is grounded through the resistor 7 when switch 6 is in position 6a. Therefore, when switch 6 is in position 6b, one identification per cycle will be obtained but when switch 6 is in position 6a, two identifications per cycle will be obtained.

The rotating contacts of switch 101 and 102 are electrically connected in parallel with the corresponding rotating contacts of switch 100. The rotating contacts of decks 100, 101 and 102 are rigidly attached to the same rotatable shaft 104 thus preventing relative angular displacement between any of the mentioned rotating contacts.

As illustrated in Fig. 1, one side of switch 6 is connected to the high side of resistor 7 and the other side of switch 6 is connected to the second rotating contacts of decks 100, 101 and 102.

Referring to Fig. 6, relay 5 is a time delay relay containing two normally open contacts. The contacts of relay 5 will close the instant a voltage is applied to the coil. However, the contacts will remain closed for a period of .2 of a second after the voltage has been removed from across the relay coil. Relay 4 is of the standard normally closed type.

Relays 4 and 5 are utilized, in conjunction with switch 17 of Figure 1, to simulate accurately Distance Measuring Equipment or Very High Frequency Omni Range station identification signals.

In describing the operation of the present invention, it will be assumed that a Distance Measuring Equipment station identification signal utilizing the letters AAA will be reproduced. As indicators 29, 31 and 33 are rotated to the letter A, the rotating contacts of each deck that cooperates with that respective indicator is rotated to the A contact. In the present invention, the negative output voltage that appears across resistor 7 is inserted into an oscillator of standard design and construction. The oscillator operates continuously, its input appearing across resistor 7 at terminal 9. The presence of the negative voltage across resistor 7 cuts off the operation of the oscillator. The circuits of Figs. 1, 2, 3, 4, 5 and 6 are accurate for the reproduction of the code word having the station identification letters of A. A. A.

In the reproduction of the first letter A, decks 37 and 39 are open circuits. The rotor arm of deck 35 makes contact with contact A thus completing a circuit between the B minus supply voltage and segment —4 of deck 100. The rotor arm of deck 41 makes a connection with contact A thus completing the circuit between the B minus voltage and segment —b of deck 101.

In the reproduction of the second letter "A" decks 45 and 47 are open circuits. The rotor arm of deck 43 completes the circuit between the B minus supply voltage and segment 2 of deck 100. The rotor arm of deck 49 completes the circuit between the B minus supply and segment b of deck 101.

The rotor of deck 51 places a voltage of B minus on contact 3+ of relay 105. Each stationary contact of deck 51 is connected to one of a number of predetermined stationary contacts of stepping relay 105. These relay contacts make electrical connections with coil 11 through rotor contact 217. One end of coil 11 is connected to contact 217. The other end of relay coil 11 is connected to the B minus voltage. One end of each resistor 13 is connected to the stationary contact that makes connection with the movable contact 217 that is connected in series with the stepping relay coil 11. The other end of each resistor 13 is connected to ground.

The operation of the stepping relay 105 is as follows. Assume that movable contact 217 is located at the 1+ contact position and the rotor of deck 51 has been rotated to the A position thus placing a voltage, having a value of B minus, on contact 3+ of the relay 105. There is a flow of current from the B minus line, through the stepping relay coil 11 to the resistor 13 through contacts 217 and 1+ and then to ground through the resistor 13 thus completing the circuit. This flow of current through the relay coil 11 actuates an arm (not shown) of relay 11 connected to shaft 106 and steps the rotor one position so that contact 217 now makes a connection with contact 2+. At the 2+ position, the above described sequence of events repeats itself and the rotor of the relay 105 is advanced to the next position. The operation of the advancement of the rotor of the relay 105 continues until rotor contact 217 makes connection with a stationary contact having a potential of B minus volts. When this last mentioned connection is completed, the rotor of relay 105 will stop stepping. This occurs because there is no voltage differential across relay coil 11 and therefore no current flow through the coil 11. There is a small flow of current through resistor 13 to ground.

The stator of the stepping relay 105 is wired to deck 100. The dots and dashes of the third letter are located properly by the orientation of the rotor contacts 15.

In the reproduction of the third letter "A" decks 55 and 57 are open circuits. The rotor arm of deck 53 completes the circuit between the B minus supply voltage and segment 10 of deck 100 through stepping relay 105. The rotor arm of deck 59 completes the circuit between the B minus supply voltage and segment 14 of deck 100. Moving around the three decks 100, 101, and 102 simultaneously the following conductive segments are electrically coupled to a negative voltage; —b of deck 101; —4 of deck 100; 2 of deck 101; 2 of 100; b of 101; and 10 and 14 of 100. The rotating brushes contact segment —b to cut off the oscillator for three-tenths of a second, after which the oscillator operates for one-tenth of a second, is then cut off for one-tenth of a second by segment —4, then operates for three-tenths of a second until cut off for three-tenths of a second by the negative voltage on segment Z. At this position, the first letter A (dot, dash) has been generated. As the brush leaves the segment Z, the oscillator functions for one-tenth of a second until cut off for one-tenth of a second by segment Z, then oscillates for three-tenths of a second (dash) until cut off for three-tenths of a second (space) by the segment b. As the brush leaves segment b, the oscillator functions for one-tenth of a second; is then cut off for one-tenth of a second by the presence of a negative voltage on segment 10, then functions for three-tenths of a second; and is then cut off by the action of segment 14. Thus, the Morse code equivalent of the three letter word AAA has been generated wherein the dots and the spacing between the characters (dots and dashes) of each letter were one-tenth of a second in duration; and the dashes and the spacing between each letter were three-tenths of a second in duration. The timing consistency obtained with the code word "AAA" is present regardless of the letter of combination of letters used.

The remaining relays 4 and 5 determine the spacing at either extreme of the identification. Relay 4 is composed of coil $P_1$ and normally closed contacts $P_{11}$. Relay 5 is composed of coil $S_1$ and normally open contacts $S_{11}$ and $S_{12}$. One relay 5 is a time delay relay (on drop out) of 0.2 of second, which provides the proper time spacing after the identification for Distance Measuring Equipment stations. This relay is operated through the final space dot character as formed by decks 59, 100, 101, 102 and stepping relay 105. During operation, relay 5 feeds the B minus voltage through the output circuit 9 to the oscillator through contacts $S_{11}$. Relay 4 is kept from operating by shorting its coil through contact 19. For all other types of stations such as Very High Frequency Omni Range or others that do not require the tone after identification, relay 5 is held operated through the normally closed contacts $P_{11}$ of relay 4 through contacts 25 and 18 of switch 17 to ground. Relay 4 is wired through deck 41 to the first space before the identification. When the brushes of decks 100, 101 and 102 makes contact with the segment corresponding to the contact of deck 41, relay 4 operates to open the contacts $P_{11}$ long enough to have delay relay 5 drop out.

For stations with two letter identification, the last space position of the second letter of deck 49 is wired into the delay relay 5 through the "Off" position of deck 59. Resistor 48 acts as an isolation resistor to prevent shorting of the coil of delay relay 5.

This structure generates the Morse code equivalent of a two or three letter code word as determined by the position of the first and second twenty-six step position knobs 29 and 31 and a third twenty-seven step position knob 33. The stepping relay 105 and the three deck switch having conducting segments receive electrical information from switches associated with said first, second and third mentioned knobs to generate the Morse code equivalent of a two or three letter word, wherein the time spacing between each letter and between the character of each letter is accurate and realistic.

The three deck switch 100, 101, and 102, and the stepping relay 105 are shown in Fig. 6. The spacing between conducting segments of the three decks 100, 101, and 102 is so related to the velocity of the rotating brushes that the rotating brush will contact each of the contacts on deck 100 for 0.1 of a second, and each of the contacts on decks 101 and 102 for 0.3 of a second. The time spacing between all except the −2 and 2 conducting segments is 0.1 of a second, the time spacing between −2 and 2 being 0.5 of a second. The time spacing between each conducting segment of deck 101 is 0.1 of a second.

On deck 102, the time spacing between each adjoining conducting segment, except between −e and e, is 0.1 of a second; the time spacing between the segments −e and e is 0.9 of a second. The position of the conducting segments of each deck are fixed relative to each other as follows: moving around each deck in a counter-clockwise direction, the rotating brushes contact simultaneously the leading edges of the conducting segment 2 of the deck 100 and the conducting segment a of the deck 100; 0.2 of a second later, the rotating brush of the deck 102 contacts the leading edge of the conducting segment c of deck 102. The rotating brushes are coupled in parallel to each other and feed an oscillator at the terminal 9.

In this device, the oscillator is on continuously and generates a continuous tone until cut off by the presence of a negative voltage at terminal 9. A negative voltage is applied steadily to the conducting segment Z of deck 101, through the conductor 27. This segment cuts off the oscillator for 0.3 of a second to generate the pause between the first and the second letters. The four decks 35, 37, 39 and 41 are utilized to generate the characters (dots and dashes) of the first letter. They are coupled electrically to discrete conducting segments of the decks 100, 101, and 102 in a manner that insures the termination of the last character of the first letter at the commencement of the oscillator cutoff signal from segment z.

The four decks 43, 45, 47 and 49 are coupled electrically to conducting segments of the decks 100, 101, and 102 in a manner that insures the commencement of the first character of the second letter at the instant that the oscillator cutoff signal from segment Z terminates.

The oscillator cutoff voltage from the segment Z produces a time spacing of three-tenths of a second around which the Morse code characters of the first and the second letters are spaced. Thus, the time spacing between the first and the second letter will always be constant and accurate. The deck 51 is coupled electrically to the stepping mechanism of the relay 105 to orient said relay to a predetermined position as determined by the duration of the character of the second letter.

The last or third letter is generated by the four decks 53, 55, 57 and 59 coupled electrically to conductive segments on deck 100 through the stepping relay 105. The particular conductive segments on the deck 100 that are coupled to said decks 53, 55, 57 and 59 are determined by the orientation of the stepping relay. The stepping relay, in combination with the deck 51, insures the commencement of the first character of the third letter three-tenths of a second after the termination of the last character of the second letter. After the last letter has been generated, the oscillator is cut-off or generates a long continuous tone as determined by indicator 17 and relays 4 and 5 as explained above.

To those experienced in the art, it will become obvious that various alterations and modifications are possible. The present invention may be used for obtaining coding for YG/ZB stations by changing the speed of the motor 3 to the proper amount.

The present invention may be altered so that a positive voltage will key the oscillator to the On position, instead of negative voltages cutting the oscillator off.

Obviously many modifications and variations of the present invention are possible in the light of the above teachings. It is therefore to be understood that within the scope of the appended claims the invention may be practiced otherwise than as specifically described.

What is claimed is:

A navigation station identification signal device comprising a plurality of rotating contacts, a plurality of electrical conducting segments that make contact with said contacts, a second plurality of conducting segments that make contact with other of said contacts and are three times the length of said first mentioned conducting segments, a third plurality of conducting segments that make contact with the remaining of said contacts and are the same length as said second named segments, a plurality of switches electrically connected to certain of said electrical conducting segments to determine the first letter of the identification signal, a second plurality of switches electrically connected to other of said electrical conducting segments to determine the second letter of the identification signal, a stepping relay connected to a plurality of said electrical conducting segments, a third plurality of switches connected to said stepping relay to determine the third letter of the identification signal, means connected to said second plurality of switches and said stepping relay to properly orient the stepping relay to obtain the proper time spacing between the letters, and means to pick off the desired signal in the form of the Morse code from the plurality of rotating contacts.

References Cited in the file of this patent

UNITED STATES PATENTS

| Number | Name | Date |
| --- | --- | --- |
| 1,972,289 | Chauveau | Sept. 4, 1934 |
| 2,207,743 | Larson | July 16, 1940 |
| 2,441,136 | Charles et al. | May 11, 1948 |
| 2,468,462 | Rea | Apr. 26, 1949 |
| 2,622,145 | Kennedy | Dec. 16, 1952 |
| 2,660,720 | Dehmel | Nov. 24, 1953 |
| 2,682,046 | Hack | June 22, 1954 |